(12) United States Patent
Grundhoefer (10) Patent No.: US 12,277,623 B2
(45) Date of Patent: Apr. 15, 2025

(54) ATTENTION-DRIVEN RENDERING FOR COMPUTER-GENERATED OBJECTS

(71) Applicant: APPLE INC., Cupertino, CA (US)

(72) Inventor: Anselm Grundhoefer, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/122,818

(22) Filed: Mar. 17, 2023

(65) Prior Publication Data

US 2023/0290014 A1   Sep. 14, 2023

Related U.S. Application Data

(63) Continuation of application No. PCT/US2021/047430, filed on Aug. 25, 2021.
(Continued)

(51) Int. Cl.
*G06T 11/00* (2006.01)
*G02B 27/01* (2006.01)
*G06F 3/01* (2006.01)

(52) U.S. Cl.
CPC .......... *G06T 11/00* (2013.01); *G02B 27/0172* (2013.01); *G02B 27/0179* (2013.01);
(Continued)

(58) Field of Classification Search
CPC ... G06T 11/00; G06T 2210/36; G06T 15/005; G02B 27/0172; G02B 27/0179; G02B 2027/014; G02B 2027/0187; G02B 2027/0147; G02B 2027/0181; G02B 27/0093; G02B 27/01; G06F 3/012; G06F 3/013; G06F 3/011; G09G 2340/0407
See application file for complete search history.

(56) References Cited

U.S. PATENT DOCUMENTS 9,329,682 B2   5/2016   Keane et al.
9,389,420 B2   7/2016   Maiocci et al.
(Continued)

FOREIGN PATENT DOCUMENTS

WO   2019/217262 A1   11/2019
WO   2020/086380 A1   4/2020

OTHER PUBLICATIONS

(PCT) European Patent Office (ISA/EP), International Search Report and Written Opinion of the International Searching Authority, International Application No. PCT/US2021/047430, 21 pages, Feb. 11, 2022.

*Primary Examiner* — Rodney Amadiz
(74) *Attorney, Agent, or Firm* — Thompson Hine LLP (57) ABSTRACT

Various implementations disclosed herein include devices, systems, and methods that are capable of adjusting the appearance of computer-generated objects (e.g., augmentations) that are predicted to be outside the current focus of an optical-see-through HMD user's attention. In some implementations, a method includes displaying a first computer-generated object and a second computer-generated object on an optical-see-though display of a HMD. In some implementations, the first computer-generated object is identified based on a prediction that the attention of a user is directed to the first computer-generated object, and an appearance of the second computer-generated object is adjusted to change from a first state to a second state.

15 Claims, 8 Drawing Sheets

Related U.S. Application Data (60) Provisional application No. 63/081,381, filed on Sep. 22, 2020.

(52) U.S. Cl.
CPC .............. G06F 3/012 (2013.01); G06F 3/013 (2013.01); *G02B 2027/014* (2013.01); *G02B 2027/0187* (2013.01); *G06T 2210/36* (2013.01)

(56) References Cited

U.S. PATENT DOCUMENTS

| | | | |
|---|---|---|---|
| 9,727,996 B2 | 8/2017 | Pandey et al. | |
| 10,373,592 B2 | 8/2019 | Tall et al. | |
| 10,401,952 B2 | 9/2019 | Young et al. | |
| 2014/0009503 A1* | 1/2014 | Gorstan | G06F 3/0481 345/680 |
| 2015/0130788 A1* | 5/2015 | Bailiang | G06T 15/20 345/419 |
| 2016/0180762 A1* | 6/2016 | Bathiche | G06F 3/038 345/174 |
| 2017/0075701 A1* | 3/2017 | Ricci | G06F 21/31 |
| 2017/0316256 A1* | 11/2017 | Kim | G06V 20/47 |
| 2018/0096520 A1* | 4/2018 | Yoshimura | G06T 15/50 |
| 2018/0136471 A1 | 5/2018 | Miller et al. | |
| 2018/0275410 A1 | 9/2018 | Yeoh et al. | |
| 2018/0286105 A1 | 10/2018 | Surti et al. | |
| 2018/0286320 A1 | 10/2018 | Tardif et al. | |
| 2018/0350032 A1 | 12/2018 | Bastani et al. | |
| 2018/0357780 A1 | 12/2018 | Young et al. | |
| 2019/0026864 A1 | 1/2019 | Chen et al. | |
| 2019/0236834 A1 | 8/2019 | Blackmon et al. | |
| 2019/0279407 A1* | 9/2019 | McHugh | G06F 3/011 |
| 2019/0287495 A1* | 9/2019 | Mathur | G02B 27/0172 |
| 2019/0354173 A1 | 11/2019 | Young et al. | |
| 2019/0384381 A1 | 12/2019 | Stafford et al. | |
| 2020/0082791 A1* | 3/2020 | Petrie | G09G 3/20 |
| 2021/0086075 A1* | 3/2021 | Cockram | G06T 13/80 |
| 2021/0142552 A1* | 5/2021 | Kimura | G06F 3/0481 |
| 2022/0113795 A1* | 4/2022 | Eder | G06F 3/012 |

\* cited by examiner

ATTENTION-DRIVEN RENDERING FOR COMPUTER-GENERATED OBJECTS

CROSS-REFERENCE TO RELATED APPLICATIONS

This patent application is a continuation of International Application No. PCT/US2021/047430 filed Aug. 25, 2021, which claims the benefit of U.S. Provisional Application No. 63/081,381 filed Sep. 22, 2020, each of which is incorporated herein by this reference in its entirety.

TECHNICAL FIELD

The present disclosure generally relates to computer-generated object-based rendering, and to systems, methods, and devices that adjust an appearance of computer-generated objects based on a predicted attention of a user.

BACKGROUND

In various electronic devices such as those using optical see-through (OST) displays, a display system to visually display virtual content requires a sufficient amount of light to ensure that the displayed content is visible to the user. For devices in which an OST display system is semi-transparent, the background light intensity is added to the displayed content. Content must be displayed with sufficient brightness to ensure that the displayed content is visible even in situations where there are significant amounts of background light, such as where there is background light from a white wall illuminated by sunlight. Generally, attempts to reduce the energy consumption of the rendering and display components of such a device focus on removing details of the displayed content that are not perceivable by the user.

SUMMARY

Various implementations disclosed herein include devices, systems, and methods that adjust the appearance of computer-generated objects (e.g., augmentations) that are predicted to be outside of a current focus of an optical see-through (OST) device user's attention. In some implementations, computer-generated objects are predicted to be outside the current focus of the user's attention based on actions of the user (e.g., gaze, context, selection, historical activity tendencies, voice, or the like). As an example, if the user's gaze indicates that the user is looking at a first object amongst a group of three objects, the first object can be predicted to be the current focus and the second and third objects can be predicted to be outside of the current focus. In some implementations, the appearance of one or more computer-generated objects outside of the current focus may be adjusted to reduce energy consumption used to render and/or display the one or more computer-generated objects. In some implementations, the adjusted appearance is object-specific rather than display area-specific. In some implementations, the appearance of the one or more computer-generated objects is adjusted to provide perceptively different appearances (e.g., the user notices the appearance differences). For example, a first computer-generated object of the plurality of computer-generated objects is identified based on predicting that the first computer-generated object is outside of the current focus of a user, and an appearance of the first computer-generated object is adjusted to change from a first state to a second state. The appearance of the first computer-generated object in the second state reduces energy consumption or other resources to render and/or display the first computer-generated object than the appearance in the first state.

In some implementations, the change of the appearance of the first computer-generated object from the first state to the second state occurs instantaneously. Alternatively, the change from the first state to the second state occurs over a time interval during which one or more intermediate states of the first computer-generated object are displayed. In some implementations, the adjusted appearance is used with a foveated display technique. For example, different display characteristics may be used to display content in different regions, e.g., in a foveated region and a non-foveated region, and two computer-generated objects may be displayed in a corresponding first state and a second state, respectively, in the same foveated or non-foveated region.

In some implementations, the adjustment in appearance of the first computer-generated object returns from the second state to the first state (e.g., to an expected display quality) as soon as the current focus (e.g., attention of) the user is predicted to return to (e.g., be directed to) the first computer-generated object. In some implementations, the change from the second state to the first state may be instantaneous (e.g., by maintaining high quality content ready for display) or implemented over a preset time period.

In some implementations, a method includes displaying a first computer-generated object and a second computer-generated object on an optical-see-though display of a head-mounted device (HMD). In some implementations, the first computer-generated object is identified based on a prediction that the attention of a user is directed to the first computer-generated object, and an appearance of the second computer-generated object is adjusted to change from a first state to a second state.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
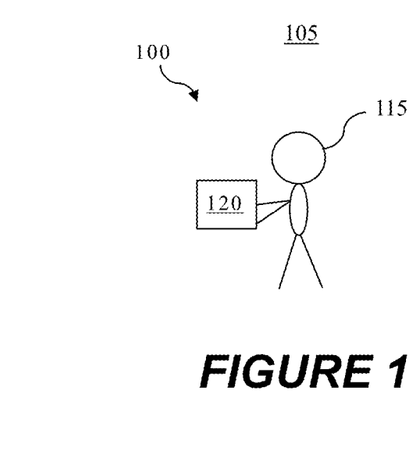
FIG. 1 illustrates an example operating environment in accordance with some implementations.

FIG. 1 illustrates an example operating environment 100 in which electronic device 120 is used in physical environment 105. A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a head-mounted device (HMD), and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 120 may communicate with one another via wired or wireless communications.

In some implementations, the device 120 is configured to manage and coordinate the appearance of computer-generated objects in an extended reality (XR) environment for the user 115. In some implementations, a first computer-generated object of a plurality of computer-generated objects at the device 120 is identified based on predicting that an attention of a user is directed to the first computer-generated object, and an appearance of a second computer-generated object is adjusted to change from a first state to a second state. In some implementations, the appearance of the second computer-generated object in the second state uses less energy consumption to render and/or display the second computer-generated object than the appearance in the first state.

According to some implementations, the electronic device 120 presents a XR environment to the user 115 while the user 115 is present within the physical environment 105. A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 2:
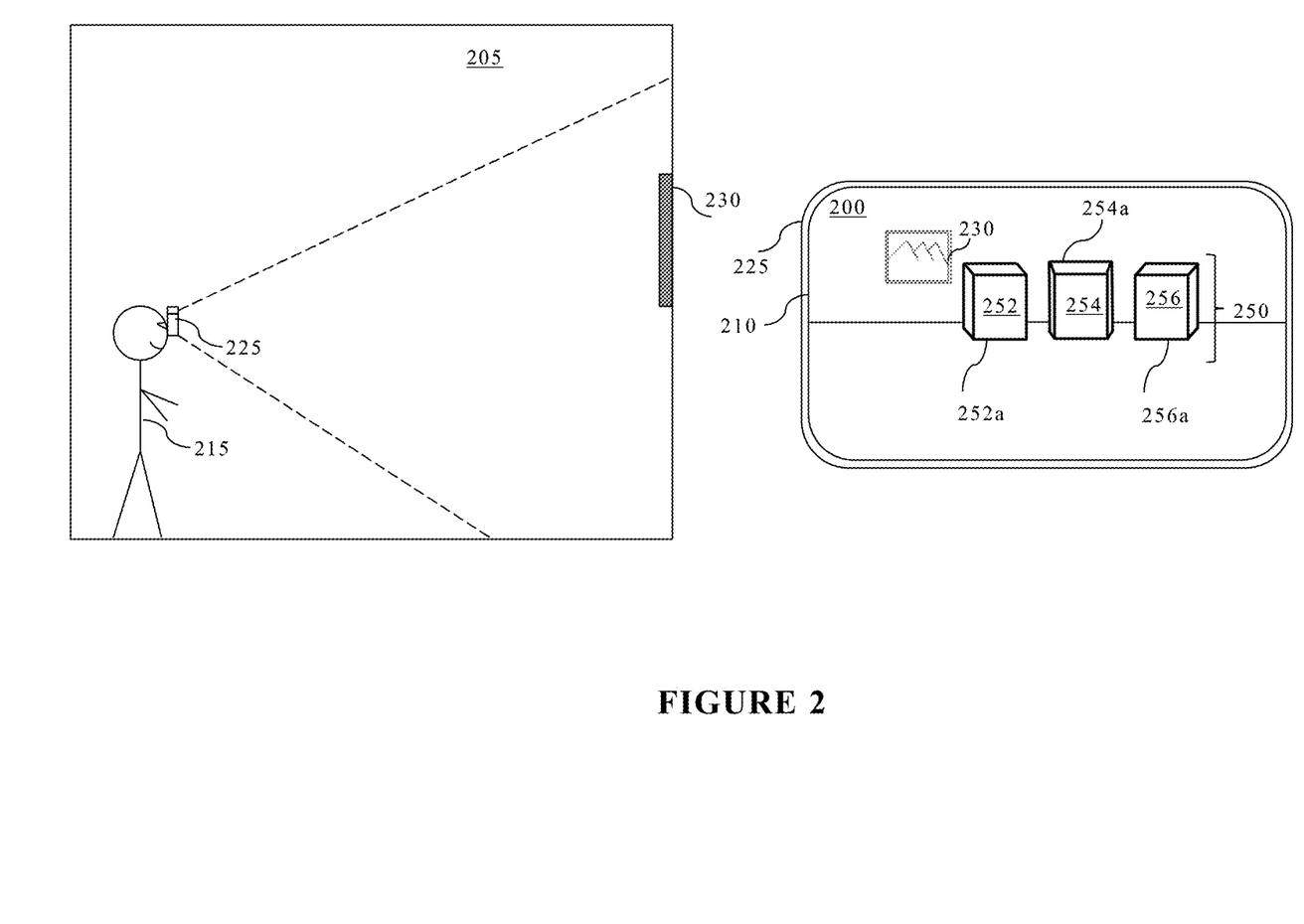
FIG. 2 is a diagram that illustrates an environment including a representation of a plurality of computer-generated objects that have an appearance adjusted based on an attention of a user of an optical see-through device in accordance with some implementations.

FIGS. 2-5 are diagrams that illustrate a XR environment including a representation of a plurality of computer-generated objects that may have an appearance adjusted based on an attention of a user of an optical see-through HMD in accordance with some implementations. In some implementations, a HMD device 225 displays a XR environment 200 based on a physical environment 205. In some implementations, an optical see-through display shows the XR environment 200 by reflecting projected images as well as allowing a view of the physical environment 205 through the display. As shown in FIG. 2, the HMD 225 displays the XR environment 200 using an optical see-through display 210 and a user 215 sees the physical environment 205 through the display 210.

In some implementations, the HMD 225 displays a plurality of computer-generated (CG) objects 250 using the display 210. As shown in FIG. 2, the plurality of computer-generated objects 250 (e.g., augmentations) includes a first CG object 252, a second CG object 254, and a third CG object 256. For example, the first CG object 252 may be an interactive weather application (e.g., an interactive UI, 3D representation, game, multi-user object, widget, etc.), the second CG object 254 may be an interactive electronic mail application, and the third CG object 256 may be an interactive stock market or investment application. In another example, the first CG object 252 may be an interactive traffic application, the second CG object 254 may be an internet browser application, and the third CG object 256 may be a streaming service providing CG objects such as music, TV, or 2D/3D movies.

As shown in FIG. 2, the first CG object 252, the second CG object 254, and the third CG object 256 are shown in a first state (e.g., the highest quality display) 252a, 254a, 256a, respectively. In some implementations, an energy consumption by the HMD 225 (e.g., display 210) is the highest when showing the plurality of computer-generated (CG) objects 250 in the first state.

In some implementations, one or more computer-generated objects of the plurality of computer-generated objects 250 is identified based on predicting that an attention of the user 215 of the HMD 225 is not directed to the one or more computer-generated objects. An appearance of the one or more computer-generated objects that are predicted to be outside the attention of the HMD user 215 can then be adjusted. For instance, an appearance of the one or more computer-generated objects 250 that are not predicted to receive the attention of the HMD user 215 can be adjusted from the first state to a second state. Energy consumption by the HMD 225 (e.g., display 210) can be reduced when one or more of the plurality of computer-generated objects 250 are displayed in the second state.

In some implementations, the one or more computer-generated objects of the plurality of computer-generated objects 250 that are predicted to be outside the attention of the HMD user 215 are determined based on the actions of the HMD user 215. For example, the one or more computer-generated objects of the plurality of computer-generated objects 250 that are not predicted to receive the attention of the HMD user 215 can be determined based on not being selected by the HMD user 215, not being interacted with by the HMD user 215, not intersecting a gaze of the HMD user 215, past actions by the HMD user 215, or a current context of the physical environment 205 or XR environment 200. When the HMD user 215 is not interacting with the first CG object 252 and based on such actions by the HMD user 215, the appearance of the first CG object 252 may be adjusted to reduce energy consumption used by the optical see-through display 210 to display the first CG object 252.

Figure 3:
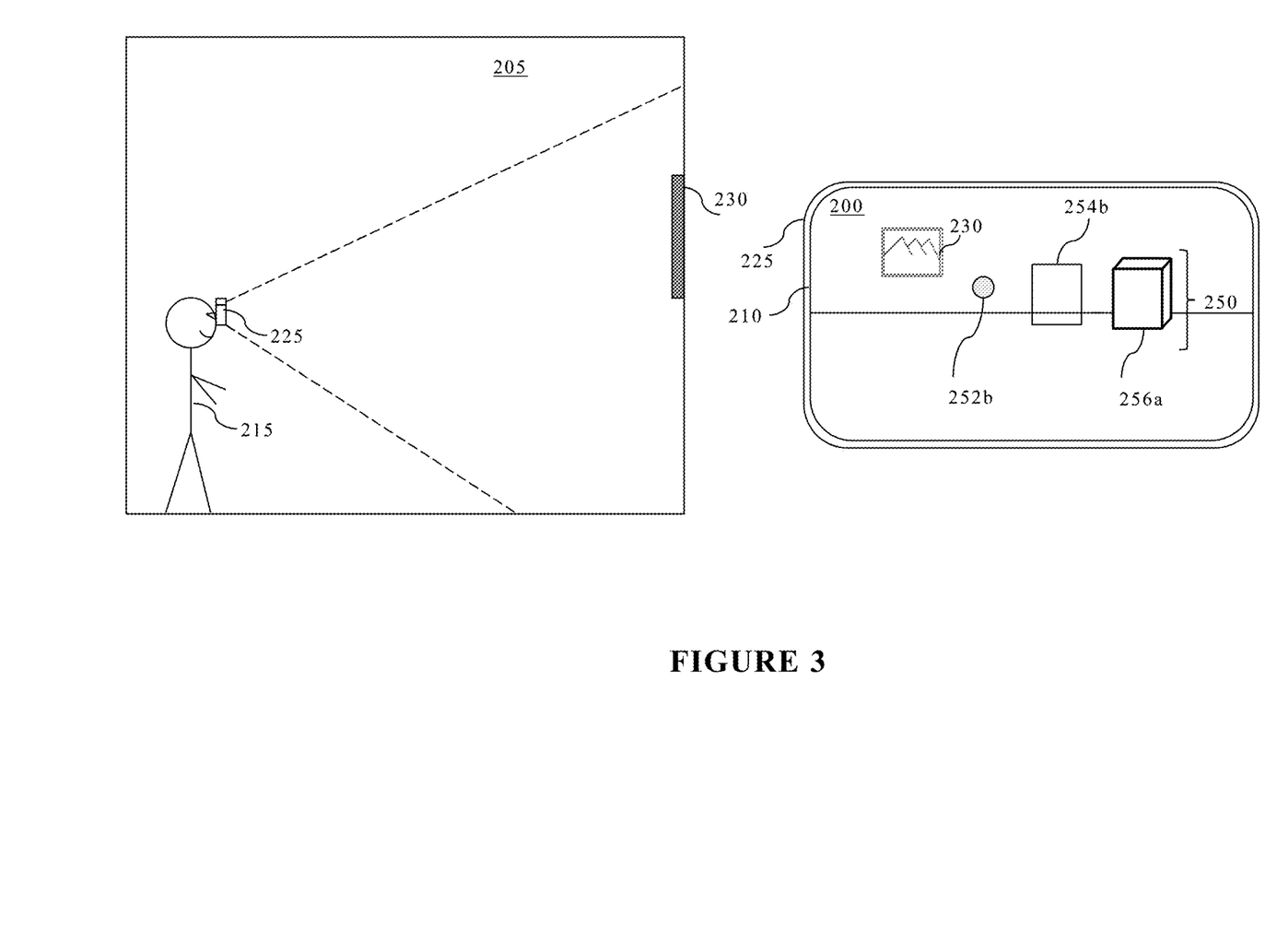
FIG. 3 is a diagram that illustrates an environment including a representation of a plurality of computer-generated objects that have an appearance adjusted based on an attention of a user of an optical see-through device in accordance with some implementations.
Figure 4:
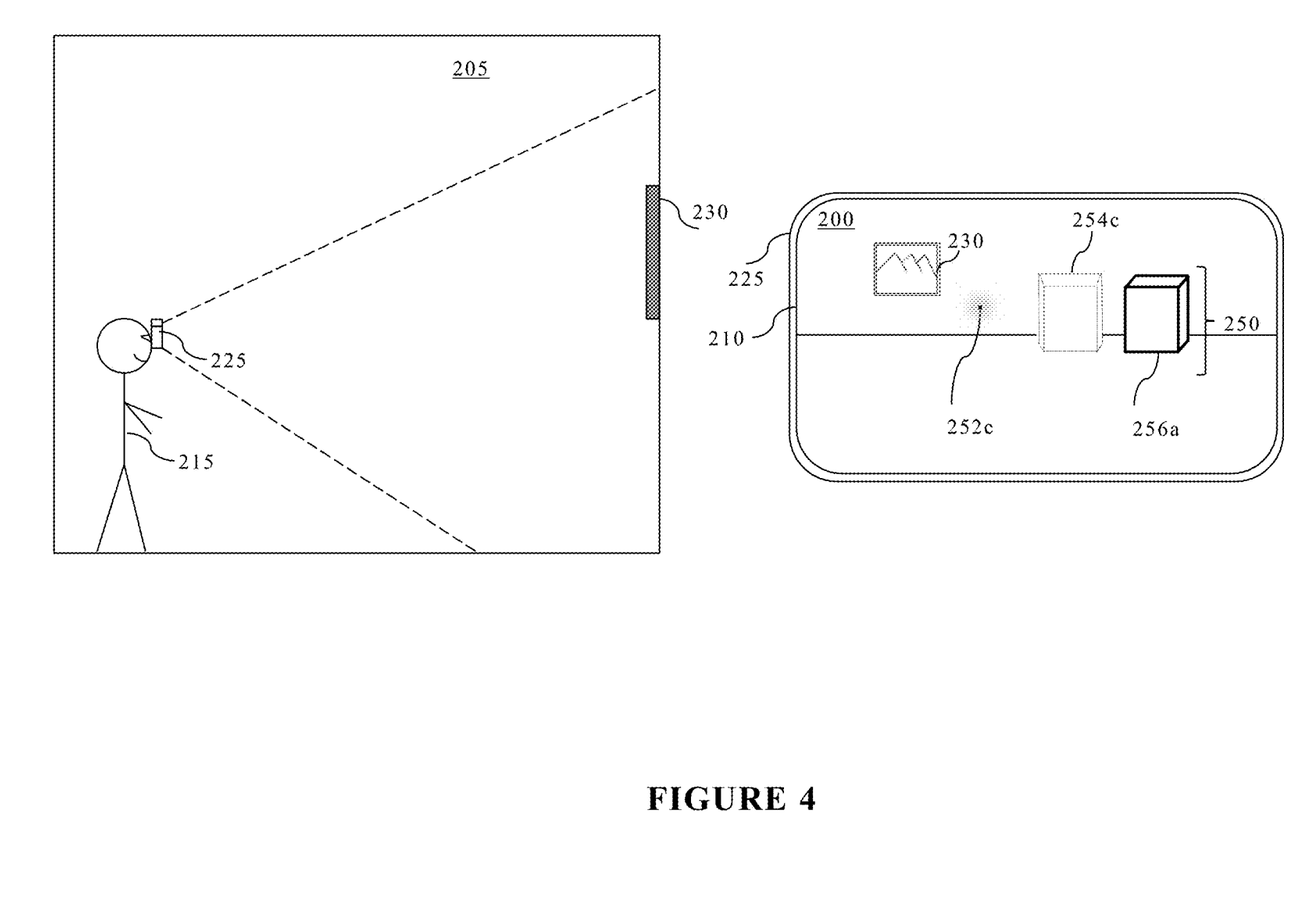
FIG. 4 is a diagram that illustrates an environment including a representation of a plurality of computer-generated objects that have an appearance adjusted based on an attention of a user of an optical see-through device in accordance with some implementations.

In an example implementation shown in FIGS. 3-4, the HMD user 215 is interacting with the third CG object 256 but not interacting with either of the first CG object 252 and the second CG object 254 for a 15 second, a 1 minute, 5 minute, or preset time period, and the first CG object 252 and the second CG object 254 are predicted to outside the attention of the HMD user 215. Accordingly, in the example implementation of FIG. 3, the appearance of the first CG object 252 and the second CG object 254 may be adjusted based on the HMD user 215 actions. As shown in FIG. 3, the first CG object 252 and the second CG object 256 are adjusted in appearance to reduce the HMD 225 energy consumption used to render (e.g., to determine an appearance of or implement display of the determined appearance) the first CG object 252 and the second CG object 254.

As shown in FIG. 3, the first CG object 252 is adjusted in appearance to a single color (e.g., red, green, or blue) simple shape representation 252b and the second CG object 254 is adjusted in appearance to a 2D wire frame representation 254b. In some implementations, the respective representations 252b and 254b show the first CG object 252 and the second CG object 254 in the second state.

Alternatively, in the example implementation shown in FIG. 4, the first CG object 252 is adjusted in appearance to a single dim light (e.g., red, green, or blue) 252c and the second CG object 254 is adjusted in appearance to a reduced illumination level 256c. In some implementations, the respective representations 252c and 254c show the first CG object 252 and the second CG object 254 in the second state, while the third CG object 256 is in the first state using the representation 256a.

Figure 5:
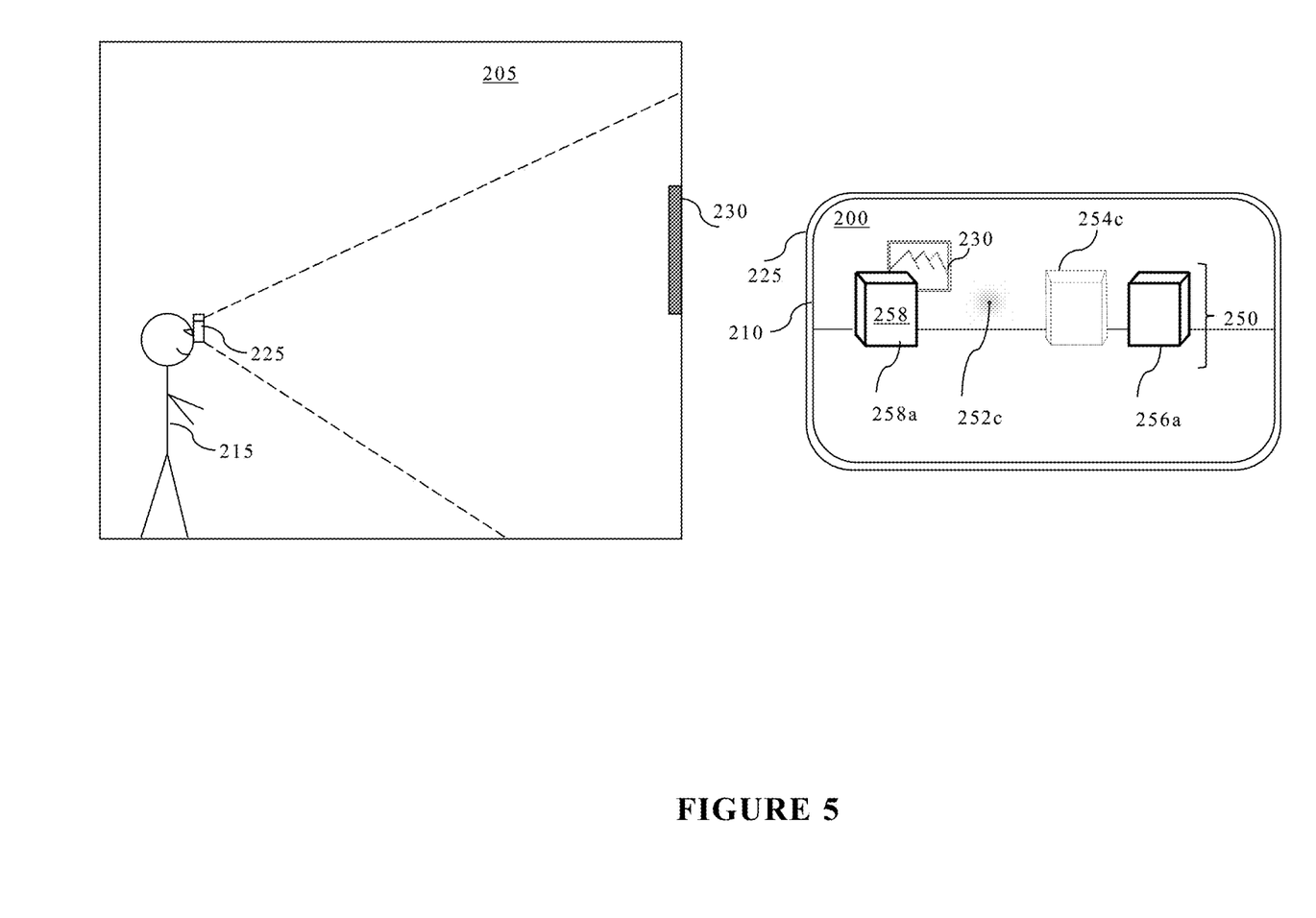
FIG. 5 is a diagram that illustrates an environment including a representation of a plurality of computer-generated objects that have an appearance adjusted based on an attention of a user of an optical see-through device in accordance with some implementations.

In an example implementation shown in FIG. 5, a fourth CG object 258 is added to the plurality of computer-generated objects 250 illustrated in the display 210 by representation 258a (e.g., a first state of the CG object 258). For example, the fourth CG object 258 may be a multi-user application such as an video call application. As shown in FIG. 5, the CG object 258 is selected by the HMD user 215 and a gaze of the HMD user 215 intersects the third CG object 256, however the HMD user 225 is still not interacting with either of the first CG object 252 and the second CG object 254. Accordingly, the respective representations 258a and 256a show the fourth CG object 258 and the third CG object 256 in the first state, while the first CG object 252 and the second CG object 254 are shown in the second state in FIG. 5.

In some implementations, the adjusted appearance reduces an energy or power requirement to display the computer-generated objects 250 using the optical see-through display 210. In some implementations, adjusting an appearance of the computer-generated objects that are predicted to be outside the current focus (e.g., not the current focus) of the HMD user's 215 attention includes reducing an illumination (LED) strength of the computer-generated objects at the OST display 210. Adjusting the appearance of the computer-generated objects may include changing the rendering quality at the OST display 210, e.g., from photo-realistic to 2D or outlines that may require less illumination or fewer light sources. Adjusting the appearance of the computer-generated objects may include reducing an amount of time displayed such as intermittently displaying or repeatedly displaying, or fading out the display (e.g., until the next selection by the user 215) by the display 210. Adjusting the appearance of the computer-generated objects may include switching to a monochrome representation (e.g., using red, blue, or green pixels instead of sets of three pixels for full RGB color). Adjusting the appearance of the computer-generated objects may include switching to a different representation such as a dot of light or a single color easily displayed shape. Adjusting the appearance of the computer-generated objects includes reducing an update rate (e.g., frames per second) at the display 210. Adjusting the appearance of the computer-generated objects includes reduce or eliminate animation or movement to reduce an illumination level or a number of light sources used. Adjusting the appearance of the computer-generated objects includes reducing a number of pixels being used. Adjusting the appearance of the computer-generated objects includes switching to a different sensory input for detection by the HMD user 215. In some implementations, switching to a different sensory input for detection by the HMD user 215 includes switching them to a secondary display (e.g., array of supplemental peripheral LEDs at the HMD 225) or using spatialized audio.

In some implementations, the adjusted appearance reduces an energy requirement to render (e.g., compute the appearance of) the computer-generated objects 250 to be displayed using the optical see-through display 210. In some implementations, adjusting an appearance of the computer-generated objects 250 that are predicted to be outside the current focus of the HMD user's 215 attention includes reducing the rendering quality (e.g., from photorealistic to 2D/outlines) so that the number of vertices in the computer-generated object drops significantly (e.g., from thousands of vertices to tens of vertices). Adjusting the appearance of the computer-generated objects includes reducing an amount of time the computer-generated object is to be displayed and computing the appearance for only those reduced times. Adjusting the appearance of the computer-generated objects includes switching to a different computationally-reduced representation such as a single dot of light or simple shapes (e.g., circle, ellipse, etc.) that may be implemented using a reduced number of pixels. Adjusting the appearance of the computer-generated objects includes switching to computing only a monochrome representation (e.g., instead of full RGB color). Adjusting the appearance of the computer-generated objects includes reducing computation required by reducing an update rate (e.g., frames per second) or reducing an accuracy of pose to be provided. In some implementations, adjusting the appearance of the computer-generated objects includes reducing computation required by reducing or eliminating computations for animation/movement (e.g., only computing a static pose).

In some implementations, adjusting the appearance of the computer-generated objects includes switching to a different sensory input to be used by the HMD user 215 that reduces computation to determine an appearance at the different sensory input (e.g., a secondary display such as an array of supplemental peripheral LEDs at the HMD 225 or using spatialized audio at the HMD 225.

In some implementations, switching to a different sensory input for detection by the HMD user 215 includes switching to representation for the HMD user 215 of the computer-generated objects 250 that use less energy than the display 210. For example, a secondary display that has a reduced energy consumption might extend across (e.g., overlap) an arc or preset shape in a prescribed location or FOV of the display 210 and a representation for each of the computer-generated objects that are not predicted to get the attention of the HMD user 215 may be displayed in the second state using the secondary display. In another example, an array of supplemental LEDs at the periphery of the display 210 may generate a visual representation that is projected into the FOV of the display 210 and each of the computer-generated objects that are predicted to be outside of the attention of the HMD user 215 may be displayed in the second state using a corresponding LED. In one implementation of the supplemental LEDs, each of the LEDs projects to a predefined position in the FOV of the display 210 (e.g., in the periphery of the FOV). In yet another example, spatialized audio may be used to generate a representation for each of the computer-generated objects 250 that are predicted to be outside the attention of the HMD user 215 may be represented in the second state. Using spatialized audio, a prescribed configuration of different audio positions and/or sounds could be arranged around the HMD user 215 (e.g., using 12 shoulder high horizontal locations of a clock face where 12 o'clock is in front and 6 o'clock is behind the user; or using 12 vertical location of a clock face 8 feet tall and 10 feet in front of the user where 12 o'clock is at the top and 6 o'clock is at the bottom), and the second state for currently used computer-generated objects 250 (e.g., up to 12 for the clock configuration) have predefined locations when presented in their second state. In some implementations, the HMD user 215 will learn corresponding spatialized audio locations or secondary predefined positions for commonly used computer-generated objects.

In some implementations, adjusting the appearance of the computer-generated objects 250 (e.g., from the first state to the second state) includes any combination of the above or additional display implementations that reduce energy consumption by the display 210 or the HMD 225. In some implementations, the adjusted appearance of the computer-generated objects 250 in the second state is measurably different from the appearance of the of the computer-generated objects 250 in the first state.

In some implementations, the computer-generated objects 250 are shown to the HMD user 215 using a plurality of states to allow additional granularity in the energy used to render and/or display one or more of the computer-generated objects 250. In some implementations, the computer-generated objects 250 are shown using different representations for each of a first state, a second state, a third state, and a fourth state where energy used to render and/or display one or more of the computer-generated objects 250 in the first state is greater than the second state, which is greater than the third state, which is greater than the fourth state. Thus, in one example, each of 4 computer-generated objects 250 may be shown in the display 210 using different corresponding representations that use one of the first state, the second state, the third state, and the fourth state, respectively. In some implementations, an appearance of each of the computer-generated objects 250 is measurably different to the HMD user 215 in each of the first through fourth states.

In some implementations, the HMD 225 maintains the capability to switch the computer-generated objects 250 having the adjusted appearance back to the interactive or highest quality rendering state (e.g., desired or expected rendering quality) as soon as the attention of the HMD user 215 is predicted to be directed at an appearance adjusted computer-generated object. In some implementations, the HMD 225 instantaneously transitions from the second state back to the first state of the appearance adjusted computer-generated objects 250 (e.g., switching the second CG object 254 from the 254b or 254c representation back to the 254a representation) by continuously maintaining content (e.g., rendering the 254a representation) while the second CG object 254 is shown in the second state. In some implementations, the attention of the HMD user 215 is predicted to be directed at (e.g., return to) the appearance adjusted computer-generated object based on actions by the user 215 (e.g., gaze, context, selection, historical activities, voice, or the like).

In some implementations, the adjusted appearance is used with foveated displays. For example, two of the computer-generated objects 250 may be displayed in a corresponding first state and a second state, respectively, in the same non-foveated region of a display.

In some implementations, predicting the attention of the HMD user 215 may involve eye characteristic analysis such as comparing a position of the computer-generated objects 250 to a gaze direction of the HMD user 215. For example, predicting that a first computer-generated object is outside of an attention of the HMD user 215 may be based on determining that gaze direction does not intersect (e.g., or within a preset angle of, within a preset spatial distance of, or within a relative spatial distance of) the first computer-generated object. In some implementations, predicting the attention of the HMD user 215 may involve analysis including how long it has been since the HMD user 215 gazed at the first computer-generated object. In some implementations, the gaze direction may be determined using images of the eyes using passive or active illumination (glints) such as IR/NIR. In some implementations, predicting the attention of the HMD user may involve receiving input from an input device (e.g., corresponding to one of the computer-generated objects 250. In some implementations, predicting the attention of the HMD user may involve using a machine learning (ML) network based on training using data from the particular user or a training set of data of many users. In some implementations, predicting the attention of the HMD user may involve using context (e.g., interpreting what the HMD user 215 is doing). For example, the context may include amount/frequency of HMD user activity, whether the HMD user is walking, driving, etc. In another example, the context may include the physical environment and whether the HMD user 215 is interacting with the physical environment 205, etc.

Figure 6:
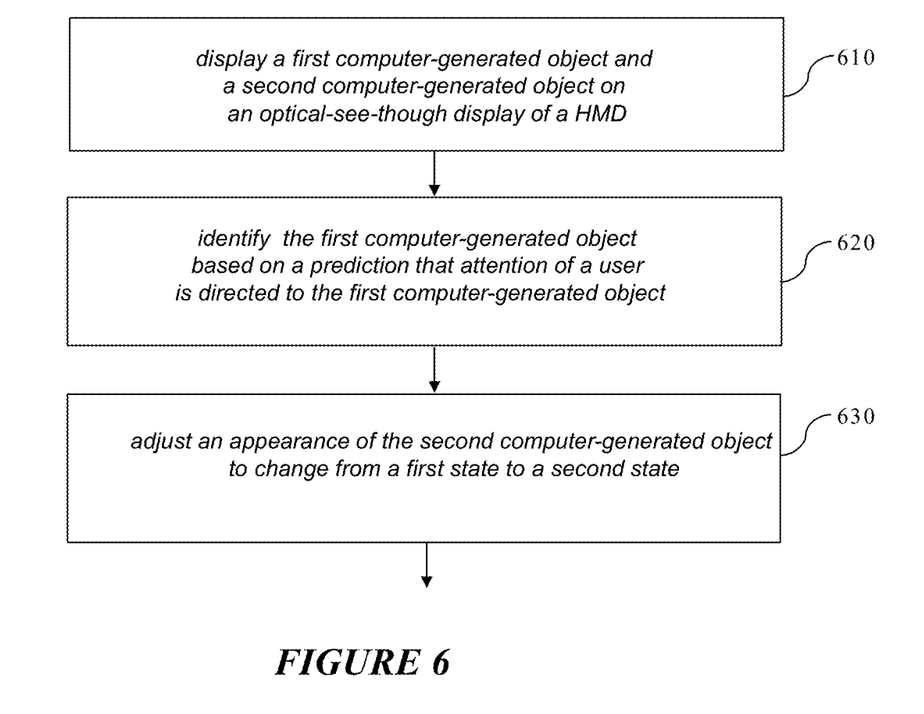
FIG. 6 is a flowchart illustrating an exemplary method of adjusting the appearance of computer-generated objects that are predicted to be outside the current focus of an optical see-through HMD user's attention in accordance with some implementations.

FIG. 6 is a flowchart illustrating an exemplary method of adjusting the appearance of computer-generated objects (e.g., augmentations, virtual objects) that are predicted to be outside the current focus of an optical see-through (OST) HMD user's attention in accordance with some implementations. In some implementations, an appearance of computer-generated objects may be adjusted to reduce energy/power consumption used to render and/or display those computer-generated objects in the optical see-through display of the HMD. In some implementations, the adjusted appearance is object-specific rather than display area-specific and provides detectably different appearances (e.g., the HMD user notices the appearance differences). In some implementations, computer-generated objects (e.g., augmentations) are predicted to be outside the current focus of the user's attention based on HMD user actions (e.g., gaze, context, selection, historical activities, voice, or the like). In some implementations, the method 600 is performed by a device (e.g., electronic device 120, 700 of FIGS. 1, 7). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 displays a first computer-generated object and a second computer-generated object (e.g., augmentations) on an optical see-though display of a HMD. For example, a HMD user may have initiated three computer-generated objects including a weather computer-generated object to the left, a video (e.g., movie or TV show) computer-generated object in the middle, and a stock tracking computer-generated object to the right. In some implementations, an optical see-through display allows the HMD user to see the real world and a XR environment simultaneously by applying a mirror that is partially transmissive and partially reflective. In some implementations, a XR environment uses computer vision 3D reconstructions provided based on scene understanding from various techniques such as VIO or SLAM.

At block 620, the method 600 identifies the first computer-generated object based on a prediction that attention of a user is directed to the first computer-generated object. In some implementations, predicting the attention of the HMD user may involve eye characteristic analysis such as comparing a position of a displayed computer-generated object to a gaze direction of the HMD user. For example, predicting that attention of the user is not directed to the first computer-generated object may be based on determining that gaze direction does not intersect the first computer-generated object and/or that a user's head pose is oriented towards the first computer-generated object. In another example, predicting that attention of the user is not directed to the first computer-generated object may be based on determining that the gaze direction intersects the second computer-generated object. In some implementations, predicting the attention of the HMD user may involve eye characteristic analysis including how long it has been since the user gazed at the object. In some implementations, the gaze direction may be determined using images of the eyes using passive or active illumination (glints) such as IR/NIR. In some implementations, predicting the attention of the HMD user may involve receiving input from an input device. In some implementations, predicting the attention of the HMD user may involve the HMD user selecting one or more computer-generated objects. In some implementations, predicting the attention of the HMD user may involve using a machine learning behavior based on the particular user or a training set of data of many users. In some implementations, predicting the attention of the HMD user may involve analyzing historical interactions between a specific user and a specific computer-generated object. In some implementations, predicting the attention of the HMD user may involve using context (e.g., interpreting what the user is doing). For example, the context may include amount/frequency of user activity, whether user is walking, driving, etc. In another example, the context may include the physical environment and whether the user interacting with the physical environment, etc.

At block 630, the method 600 adjusts an appearance of the second computer-generated object to change from a first state to a second state. In some implementations, the adjustment in appearance of the second computer-generated object from the first state to the second state is detectable. In some implementations, the change from the first state to the second state occurs over a time interval during which one or more intermediate states of the second computer-generated object are displayed. In some implementations, the change from the first state to the second state occurs instantaneously.

In some implementations, the adjustment in appearance of the second computer-generated object from the first state to the second state reduces energy consumed performing computations at the HMD required to determine an appearance of the second computer-generated object, for display. In some implementations, the adjustment in the appearance to the second state includes reducing an amount of movement of the computer-generated object (e.g., leaving the object in a static location rather than calculating movements), reducing a complexity/quality of a representation used to display the second computer-generated object (e.g., from photorealistic or a complex 3D object to a simple single color 2D object or dot of light), reducing accuracy of a position or orientation of a viewpoint used for displaying the second computer-generated object, etc. In some implementations, the adjustment in the appearance to the second state includes any combination of adjustments.

In some implementations, the adjustment in appearance of the second computer-generated object from the first state to the second state reduces energy required to actually implement display of the determined appearance of the second computer-generated object. In some implementations, the adjustment in the appearance to the second state includes reducing an illumination strength corresponding to the second computer-generated object, reducing a number of illuminated pixels corresponding to the second computer-generated object, reducing a color characteristic (e.g., switching to a monochrome representation instead of full RGB color), reducing an update rate (e.g., frames per second), eliminating or intermittently displaying the second computer-generated object, reducing a complexity of a representation used to display the second computer-generated object (e.g., single color 2D object, dot of light), etc. In some implementations, the adjustment in the appearance from the first state to the second state includes any combination of adjustments.

In some implementations, the adjustment in appearance of the second computer-generated object from the first state to the second state includes illuminating a portion of a separate display of the HMD (e.g., the second computer-generated object is not displayed using the OST display). In some implementations, the adjustment in appearance of the second computer-generated object from the first state to the second state includes representing the second computer-generated object using spatialized audio (e.g., switching from display to spatialized audio).

In some implementations, the adjustment in appearance of the second computer-generated object returns from the second state to the first state (e.g., to an expected display quality) as soon as the HMD user's attention is directed back to the second computer-generated object (e.g., using predicted HMD user attention). Thus, in some implementations, the method 600 further includes predicting that attention of the HMD user has switched to be directed to (e.g., back to) the second computer-generated object, and adjusting the appearance of the second computer-generated object to change from the second state to the first state. In some implementations, the change from the second state to the first state may be instantaneous (e.g., by maintaining high quality content ready for display) or implemented over a preset time period.

Figure 7:
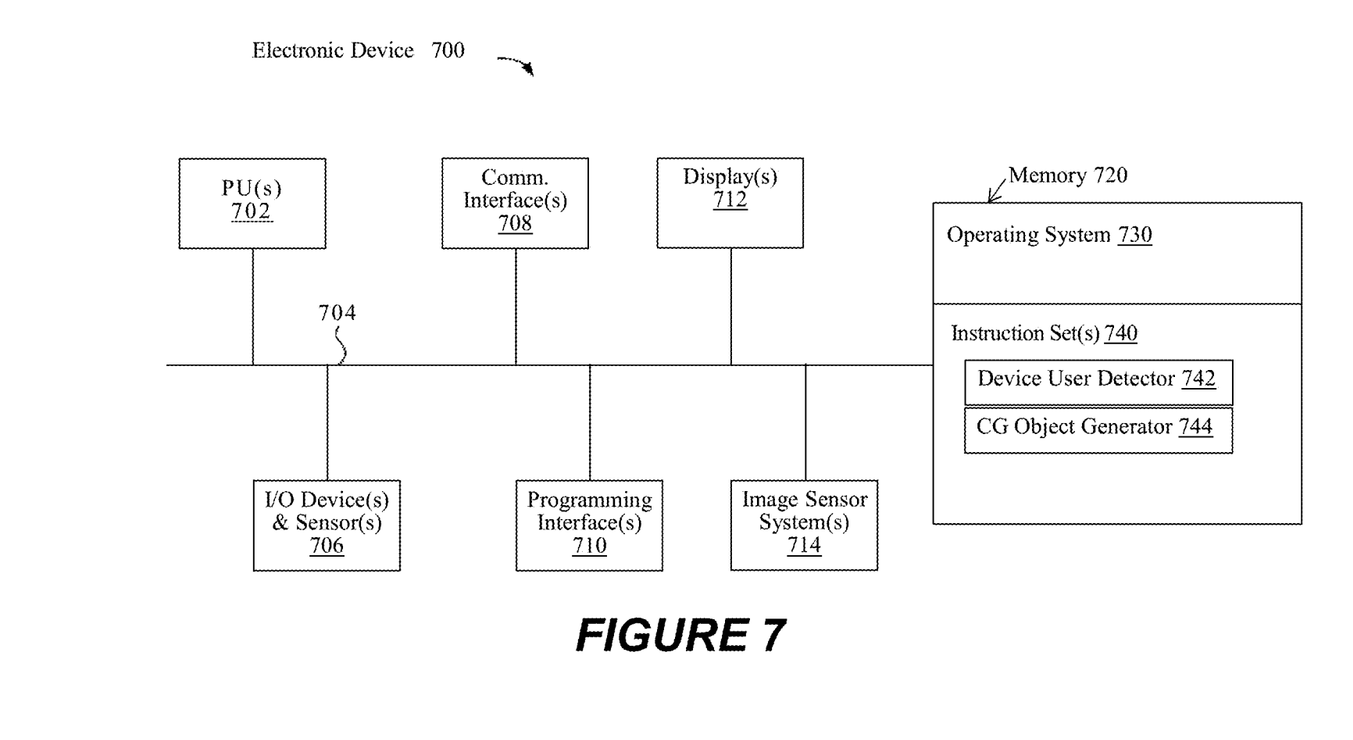
FIG. 7 illustrates an example electronic device in accordance with some implementations.

FIG. 7 is a block diagram of an example device 700. Device 700 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 710, one or more displays 712, one or more interior or exterior facing sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present content to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. For example, the electronic device 700 may include a single display. In another example, the electronic device 700 includes a display for each eye of the user.

In some implementations, the one or more interior or exterior facing sensor systems 714 include an image capture device or array that captures image data or an audio capture device or array (e.g., microphone) that captures audio data. The one or more image sensor systems 714 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 714 further include an illumination source that emits light such as a flash. In some implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

In some implementations, the instruction set(s) 740 include device user detector 742 that is executable by the processing unit(s) 702 to predict or determine an attention of a user of the device 700 according to one or more of the techniques disclosed herein. In some implementations, a current focus of a HMD user's attention is predicted based on detected actions of the HMD user (e.g., gaze, context, selection, historical activity tendencies, voice, or the like).

In some implementations, the instruction set(s) 740 include a computer-generated (CG) object generator 744 that is executable by the processing unit(s) 702 to determine a representation of one or more computer-generated objects according to one or more of the techniques disclosed herein. In some implementations, the CG object generator 744 is executed to adjust an appearance of computer-generated objects from a first state to a second state that reduces the energy consumption used to show (e.g., reducing the energy used to determine an appearance of and/or implement display of the determined appearance) the computer-generated objects based on the attention of the user of the device 700.

Although the instruction set(s) 740 are shown as residing on a single device, it should be understood that in other implementations, any combination of the elements may be located in separate computing devices. FIG. 7 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

Figure 8:
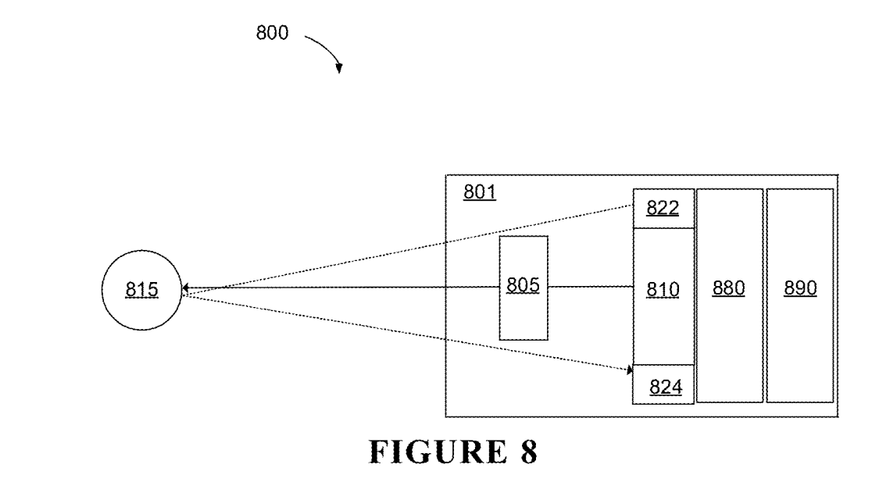
FIG. 8 illustrates an exemplary HMD in accordance with some implementations.

FIG. 8 illustrates a block diagram of an exemplary HMD 800 in accordance with some implementations. In some implementations, the device 800 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 815. Moreover, the illumination source of the device 800 may emit NIR light to illuminate the eyes of the user 815 and the NIR camera may capture images of the eyes of the user 815. In some implementations, images captured by the eye tracking system may be analyzed to detect position and movements of the eyes of the user 815, or to detect a gaze direction of one or both eyes. In some implementations, the eye tracking system may detect other information about the eyes such as blinking (e.g., rate or duration), pupil dilation, or saccadic movements. Moreover, the point of gaze estimated from the eye tracking images may enable gaze-based interaction with content shown on the near-eye display of the device 800.

As shown in FIG. 8, the head-mounted device 800 includes a housing 801 (or enclosure) that houses various components of the head-mounted device 800. The housing 801 includes (or is coupled to) an eye pad (not shown) disposed at a proximal (to the user 815) end of the housing 801. In various implementations, the eye pad is a plastic or rubber piece that comfortably and snugly keeps the head-mounted device 800 in the proper position on the face of the user 815 (e.g., surrounding the eye of the user 815).

The housing 801 houses a display 810 that displays an image, emitting light towards or onto the eye of a user 815. In various implementations, the display 810 emits the light through an eyepiece having one or more lenses 805 that refracts the light emitted by the display 810, making the display appear to the user 815 to be at a virtual distance farther than the actual distance from the eye to the display 810. For the user 815 to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, and a controller 880. The one or more light sources 822 emit light onto the eye of the user 815 that reflects as a light pattern (e.g., a circle of glints) that can be detected by the camera 824. Based on the light pattern, the controller 880 can determine an eye tracking characteristic of the user 815. For example, the controller 880 can determine a gaze direction of one or both eyes of the user 815. In another example, the controller 880 can determine a blinking state (eyes open or eyes closed) of the user 815. As yet another example, the controller 880 can determine saccadic movements, a pupil center, a pupil size, or a point of regard. Thus, in various implementations, the light is emitted by the one or more light sources 822, reflects off the eye of the user 815, and is detected by the camera 824. In various implementations, the light from the eye of the user 815 is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In some implementations, eye tracking (or, in particular, a determined gaze direction) is used to track a focal distance of the user 815 (e.g., over time). In some implementations, eye tracking (or, in particular, a determined gaze direction) is also used to enable user interaction (e.g., the user 815 selects an option on the display 810 by looking at it), provide foveated rendering (e.g., present a higher resolution in an area of the display 810 the user 815 is looking at and a lower resolution elsewhere on the display 810), or correct distortions (e.g., for images to be provided on the display 810).

In various implementations, the one or more light sources 822 emit light towards the eye of the user 815 which reflects in the form of a plurality of glints.

In various implementations, the camera 824 is a frame/shutter-based camera that, at a particular point in time or multiple points in time at a frame rate, generates an image of the eye of the user 815. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 824 is an event camera comprising a plurality of light sensors (e.g., a matrix of light sensors) at a plurality of respective locations that, in response to a particular light sensor detecting a change in intensity of light, generates an event message indicating a particular location of the particular light sensor.

In some implementations, the device 800 uses 3D computer vision reconstruction techniques to generate a 3D map of a physical environment 805. In some implementations, the device 800 obtains image(s) of the physical environment 805 using one or more image sensors 890 (e.g., camera or depth sensor). In some implementations, the image is a 2D image or a 3D image. In some implementations, the image sensor 890 is an outward-facing sensor at the device 800. In some implementations, the image sensor 890 can be a RGB camera, a depth sensor, a RGB-D camera, one or more 2D cameras, IR cameras, or the like. In some implementations, combinations of sensors are used. In some implementations, the images are used to generate the 3D map of the physical environment 805 at the device 800. In some implementations, the image sensor 890 is used to generate a XR environment representing at least a portion of the physical environment 805. In some implementations, the image sensor 890 is used to generate virtual content for the XR environment supplementing the physical environment 805. In some implementations, the XR environment is generated using Visual Inertial Odometry (VIO) or Simultaneous Localization and Mapping (SLAM) position tracking or the like at the device 800. In some implementations, color images can be used. Alternatively, in some implementations, grayscale images can be used.

In some implementations, the device 800 uses a VIO system to track the position of the device 800 in the physical environment. In some implementations, VIO tracks 6 DOF movement of the device 800 in the physical environment 805 (e.g., 3 DOF of spatial (xyz) motion (translation), and 3 DOF of angular (pitch/yaw/roll) motion (rotation) in realtime. In some implementations, VIO recalculates or updates the position of the electronic device position in the physical environment 805 in-between every frame refresh on a display of the device 800. For example, VIO recalculates the device 800 position 10, 30, or 60 or more times a second. In some implementations, VIO tracks the position using a visual sensor (e.g., camera system) by matching a point in the real world to a pixel on the image sensor in each frame and using an inertial system (e.g., accelerometer and gyroscope, inertial measurement unit (IMU), etc.). In some implementations, VIO tracks the distance that the device 800 traveled in the physical environment 805. In some implementations, VIO is implemented by a software development kit providing a XR development platform for electronic devices. In some implementations, VIO generates and updates the 3D map for the physical environment 805.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art. Various implementations disclosed herein include devices, systems, and methods that provide an optical see-through display on a HMD including various features described herein (e.g., individually or in combination).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor:
   displaying a first computer-generated object, a second computer-generated object, and a third computer-generated object on an optical-see-though display of a head-mounted device (HMD);
   generating a prediction that attention of a user is directed to the first computer-generated object;
   based on the prediction that attention of the user is directed to the first computer-generated object and the first computer-generated object being different than the second computer-generated object and the third computer generated object, identifying the second computer-generated object and the third computer generated object for adjusted rendering;
   based on identifying the second computer-generated object for adjusted rendering, rendering the second computer-generated object based on a first adjusted rendering parameter, the first adjusted rendering parameter comprising an adjusted parameter that adjusts a first rendering characteristic that is different than resolution and that reduces a rendering quality of the second computer-generated object; and
   based on identifying the third computer-generated object for adjusted rendering, rendering the third computer-generated object based on a second adjusted rendering parameter, the second adjusted rendering parameter comprising an adjusted parameter that adjusts a second rendering characteristic that is different than the first rendering characteristic and resolution and that reduces a rendering quality of the third computer-generated object.

2. The method of claim 1, wherein predicting that user attention is directed to the first computer-generated object is based on using a machine learning model trained using behavior data of the user or other users.

3. The method of claim 1, wherein said adjusting the rendering type is performed via a combination of rendering type adjustments.

4. The method of claim 1, wherein the first adjusted rendering parameter adjusts the first rendering characteristic based on a first user action, and wherein the second adjusted rendering parameter adjusts the second rendering characteristic based on a second user action.

5. The method of claim 1, wherein the first adjusted rendering parameter adjusts the first rendering characteristic based on a first object type of the second computer-generated object, and wherein the second adjusted rendering parameter adjusts the second rendering characteristic based on a second object type of the third computer-generated object, the first object type differing from the second object type.

6. A system comprising:
   memory; and
   one or more processors coupled to the memory, wherein the memory comprises program instructions that, when executed by the one or more processors, cause the system to perform operations comprising:
   displaying a first computer-generated object, a second computer-generated object, and a third computer-generated object on an optical-see-though display of a head-mounted device (HMD);
   generating a prediction that attention of a user is directed to the first computer-generated object;
   based on the prediction that attention of the user is directed to the first computer-generated object and the first computer-generated object being different than the second computer-generated object and the third computer generated object, identifying the second computer-generated object and the third computer generated object for adjusted rendering;
   based on identifying the second computer-generated object for adjusted rendering, rendering the second computer-generated object based on a first adjusted rendering parameter, the first adjusted rendering parameter comprising an adjusted parameter that adjusts a first rendering characteristic that is different than resolution and that reduces a rendering quality of the second computer-generated object; and
   based on identifying the third computer-generated object for adjusted rendering, rendering the third computer-generated object based on a second adjusted rendering parameter, the second adjusted rendering parameter comprising an adjusted parameter that adjusts a second rendering characteristic that is different than the first rendering characteristic and resolution and that reduces a rendering quality of the third computer-generated object.

7. The system of claim 6, wherein use of the adjusted rendering parameter reduces illumination of the second computer-generated object.

8. The system of claim 6, wherein use of the adjusted rendering parameter provides an adjusted color and an adjusted shape for the second computer-generated object.

9. The system of claim 6, wherein use of the adjusted rendering parameter switches the second computer-generated object from color to monochrome.

10. The system of claim 6, wherein use of the adjusted rendering parameter switches a display component used to display the second computer-generated object.

11. The system of claim 6, wherein use of the adjusted rendering parameter reduces update rate of the second computer-generated object.

12. The system of claim 6, wherein use of the adjusted rendering parameter reduces accuracy of pose detection used in rendering the second computer-generated object.

13. The system of claim 6, wherein use of the adjusted rendering parameter reduces a number of pixels used in rendering the second computer-generated object.

14. The system of claim 6, wherein resolution of the second computer-generated object is also adjusted based on identifying the second computer-generated object for adjusted rendering.

15. A non-transitory computer-readable storage medium, storing program instructions computer-executable on a computer to perform operations comprising:

displaying a first computer-generated object, a second computer-generated object, and a third computer-generated object on an optical-see-though display of a head-mounted device (HMD);

generating a prediction that attention of a user is directed to the first computer-generated object;

based on the prediction that attention of the user is directed to the first computer-generated object and the first computer-generated object being different than the second computer-generated object and the third computer generated object, identifying the second computer-generated object and the third computer generated object for adjusted rendering;

based on identifying the second computer-generated object for adjusted rendering, rendering the second computer-generated object based on a first adjusted rendering parameter, the first adjusted rendering parameter comprising an adjusted parameter that adjusts a first rendering characteristic that is different than resolution and that reduces a rendering quality of the second computer-generated object; and based on identifying the third computer-generated object for adjusted rendering, rendering the third computer-generated object based on a second adjusted rendering parameter, the second adjusted rendering parameter comprising an adjusted parameter that adjusts a second rendering characteristic that is different than the first rendering characteristic and resolution and that reduces a rendering quality of the third computer-generated object.

* * * * *